(12) United States Patent
Lee (10) Patent No.: US 7,096,293 B2
(45) Date of Patent: Aug. 22, 2006

(54) DYNAMIC BUS ARBITRATION METHOD AND BUS ARBITER

(75) Inventor: Cheon-Su Lee, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 205 days.

(21) Appl. No.: 10/766,410

(22) Filed: Jan. 28, 2004

(65) Prior Publication Data

US 2005/0010706 A1    Jan. 13, 2005

(30) Foreign Application Priority Data

Jun. 26, 2003   (KR) ..................... 10-2003-0042135

(51) Int. Cl.
*G06F 13/00* (2006.01)
*G06F 13/36* (2006.01)
*G06F 13/14* (2006.01)

(52) U.S. Cl. ...................... 710/244; 710/107; 710/113
(58) Field of Classification Search ................. 710/244, 710/113, 107
See application file for complete search history.

(56) References Cited

U.S. PATENT DOCUMENTS 5,845,097 A * 12/1998 Kang et al. ................. 710/117
6,092,137 A * 7/2000 Huang et al. ............... 710/111
6,138,197 A * 10/2000 Cheng ........................ 710/117
6,145,040 A * 11/2000 LaBerge et al. ............ 710/107
6,473,817 B1 * 10/2002 Jeddeloh .................... 710/113
6,654,833 B1 * 11/2003 LaBerge .................... 710/107
6,810,456 B1 * 10/2004 Kim .......................... 710/240
6,826,640 B1 * 11/2004 Chang ....................... 710/107
2003/0105899 A1 * 6/2003 Rosenbluth et al. ........ 710/104

FOREIGN PATENT DOCUMENTS

JP      2000-35954    2/2000
WO     WO 9812645    3/1998

* cited by examiner

*Primary Examiner*—John R. Cottingham
*Assistant Examiner*—Christopher Daley
(74) *Attorney, Agent, or Firm*—F. Chau & Associates, LLC (57) ABSTRACT

A method of arbitrating a system bus shared by a CPU, which is a first master device, and second and third master devices comprises storing a first bus occupancy rate for each master device and a variable bus occupancy rate. When an interrupt signal provided to the CPU is activated, a second rate for the CPU, which is a sum of the first rate for the CPU and the variable rate, and the first rates for the second and third master devices are applied to a bus arbiter. When the interrupt signal is inactivated, a third rate for the CPU, which is obtained by subtracting the variable rate from the first rate for the CPU, and the first rates for the second and third master devices are applied to the bus arbiter. A use priority of the system bus is controlled according to the rates applied to the bus arbiter.

17 Claims, 5 Drawing Sheets

DYNAMIC BUS ARBITRATION METHOD AND BUS ARBITER

BACKGROUND OF THE INVENTION

1. Field of the Invention

The present invention relates to a bus arbiter, and more particularly, to a bus arbiter for determining priorities for using a common bus using an interrupt signal or a privilege signal and a method thereof.

2. Description of Related Art

A data processing system including various functional blocks is typically implemented in a System On Chip (SOC) device. The SOC includes bus master devices, which share a common bus and/or memory. A bus arbiter controls access to the common bus so as to prevent, for example, bus master devices from simultaneously using the common bus.

Figure 1:
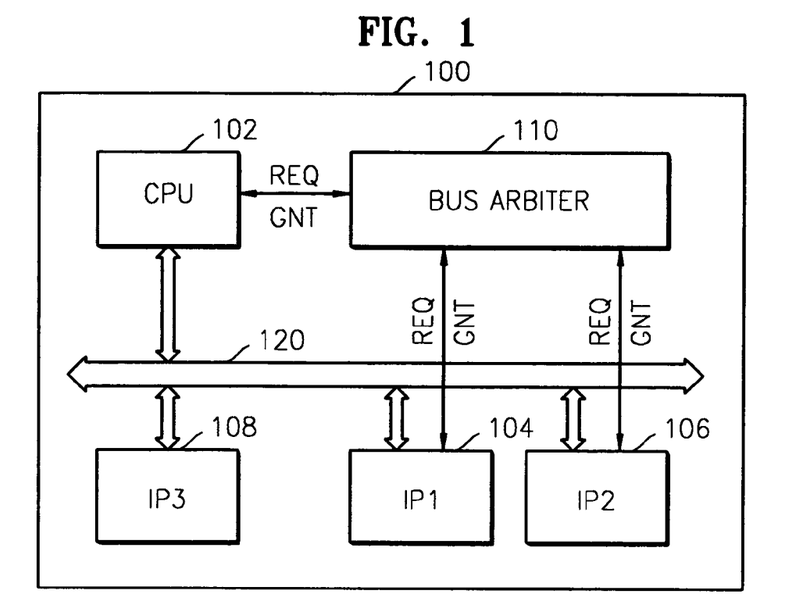
FIG. 1 is a block diagram of a data processing system implemented on a SOC.

FIG. 1 illustrates a data processing system 100 implemented as a SOC. The data processing system 100 includes a central processing unit (CPU) 102, which is a first bus master device, a second bus master IP1 104, a third bus master device IP2 106, a bus slave device IP3 108, and a bus arbiter 110. The CPU 102, the IP1 104, the IP2 106, and the IP3 108 share a system bus 120. Each of the IP1 104 and the IP2 106 can be a peripheral component interconnection (PCI) master controller, a direct memory access (DMA) controller, an Ethernet controller, or the like. The IP3 108 bus slave device can be, for example, a memory controller.

In the data processing system 100, the CPU 102, the IP1 104, and the IP2 106 send respective bus request signals REQ to the bus arbiter 110. The bus arbiter 110 determines a priority of bus use by selecting one from the CPU 102, the IP1 104, and the IP2 106 and sending a bus grant signal GNT to the selected device. The bus arbiter 110 determines a next master device to use the system bus 120, using an arbitrated priority list set in a conventional bus arbitration algorithm. An arbitrated priority list 210 of FIG. 2 can be stored in the bus arbitration algorithm.

Figure 2:
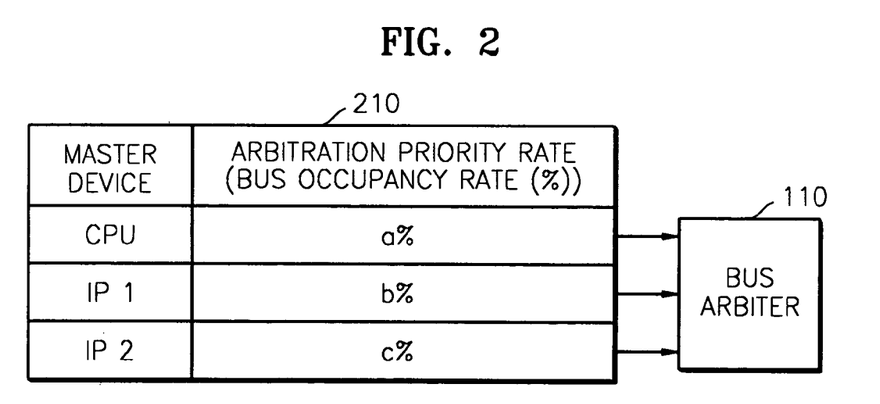
FIG. 2 shows an arbitration priority list set in a conventional bus arbitration algorithm.

In the arbitrated priority list 210, a certain bus occupancy rate (%) is set for each master device. The CPU 102 is assigned a%, the IP1 104 is assigned b%, and the IP2 106 is assigned c%. The a% for the CPU 102 is generally higher than the b% for the IP1 104 or the c% for IP2 106. Hence, in response to bus request signals REQ from the bus master devices 102, 104, and 106, the bus arbiter 110 controls the use of the system bus 120 so that a higher priority is given to the CPU 102 and a lower priority is given to the IP1 104 or the IP2 106.

In a Real Time Operation System (RTOS), which implements compression and decompression in real time, if the priorities of the bus mater devices 102, 104, and 106 are controlled in accordance with a fixed arbitrated priority sequence as shown in FIG. 2, the CPU 102 is always assigned a highest priority even when it has not requested use the system bus 120 to achieve fast processing. In other words, the RTOS cannot immediately respond to a bus request signal REQ from the IP1 104 or the IP2 106. Hence, the RTOS provides low bus use efficiency. Also, the RTOS cannot be expected to have high performance where the RTOS immediately responds to various operation patterns by dynamically switching the priority of use of the system bus 120 according to an adopted operating pattern.

Therefore, a need exists for a RTOS multi-processor system having improved system bus use efficiency.

SUMMARY OF THE INVENTION

A bus arbitration method increases the bus use efficiency of a real time operating system (RTOS).

An RTOS multi-processor system comprises a bus arbiter and provides improved bus use efficiency.

According to an embodiment of the present invention, a method arbitrates a system bus that is shared by a CPU, which is a first master device, and second and third master devices. A first bus occupancy rate for each of the CPU and the second and third master devices and a variable bus occupancy rate are stored. A second bus occupancy rate for the CPU, which is a sum of the first bus occupancy rate for the CPU and the variable bus occupancy rate, and the first bus occupancy rates for the second and third master devices are applied to a bus arbiter in response to the activation of an interrupt signal provided to the CPU. In response to the inactivation of the interrupt signal, a third bus occupancy rate for the CPU, which is obtained by subtracting the variable bus occupancy rate from the first bus occupancy rate for the CPU, and the first bus occupancy rates for the second and third master devices are applied to the bus arbiter. A priority of use of the system bus is controlled in accordance with the second and third bus occupancy rates for the CPU and the first bus occupancy rates of the second and third master devices that are applied to the bus arbiter.

According to an embodiment of the present invention, a method arbitrates a system bus that is shared by a CPU, which is a first master device, and second and third master devices. A first bus occupancy rate for each of the CPU and the second and third master devices and a variable bus occupancy rate are stored. A second bus occupancy rate for the CPU, which is a sum of the first bus occupancy rate for the CPU and the variable bus occupancy rate, and the first bus occupancy rates for the second and third master devices are applied to a bus arbiter in response to the activation of a privilege mode signal generated by the CPU. In response to the inactivation of the privilege mode signal, a third bus occupancy rate for the CPU, which is obtained by subtracting the variable bus occupancy rate for the CPU, and the first bus occupancy rates for the second and third master devices are applied to the bus arbiter. A priority of use for the system bus is controlled in accordance with the second and third bus occupancy rates for the CPU and the first bus occupancy rates of the second and third master devices that are applied to the bus arbiter.

According to an embodiment of the present invention, a method arbitrates a system bus that is shared by a CPU, which is a first master device, and second and third master devices. A first bus occupancy rate for each of the CPU and the second and third master devices and a variable bus occupancy rate are stored. A second bus occupancy rate for the CPU, which is a sum of the first bus occupancy rate for the CPU and the variable bus occupancy rate, and the first bus occupancy rates for the second and third master devices are applied to a bus arbiter in response to the activation of an interrupt signal provided to the CPU or a privilege mode signal generated by the CPU. In response to the inactivation of the interrupt signal or the privilege mode signal, a third bus occupancy rate for the CPU, which is obtained by subtracting the variable bus occupancy rate from the first bus occupancy rate for the CPU, and the first bus occupancy rates for the second and third master devices are applied to the bus arbiter. A priority of use for the system bus is controlled in accordance with the second and third bus occupancy rates for the CPU and the first bus occupancy rates of the second and third master devices that are applied to the bus arbiter.

According to an embodiment of the present invention, a system comprises a CPU, which is a first master device, and second and third master devices, which share a system bus. The system comprises a storage device and a bus arbiter. The storage device stores first bus occupancy rates for the second and third master devices and a variable bus occupancy rate for increasing or decreasing a first bus occupancy rate for the CPU. In response to an interrupt signal provided to the CPU, the bus arbiter receives either a second bus occupancy rate for the CPU, which is a sum of the first bus occupancy rate for the CPU and the variable bus occupancy rate, or a third bus occupancy rate for the CPU, which is obtained by subtracting the variable bus occupancy rate from the first bus occupancy rate for the CPU. The bus arbiter also receives the first bus occupancy rates for the second and third master devices and controls a priority of use for the system bus in accordance with received bus occupancy rates for the CPU and the second and third master devices.

Preferably, the bus arbiter comprises a multiplexer that receives either the second bus occupancy rate for the CPU or the third bus occupancy rate for the CPU in response to the interrupt signal provided to the CPU.

According to an embodiment of the present invention, a system comprises a CPU, which is a first master device, and second and third master devices, which share a system bus. The system comprises a storage device and a bus arbiter. The storage device stores first bus occupancy rates for the second and third master devices and a variable bus occupancy rate for increasing or decreasing a first bus occupancy rate for the CPU. In response to a privilege mode signal generated by the CPU, the bus arbiter receives either a second bus occupancy rate for the CPU, which is a sum of the first bus occupancy rate for the CPU and the variable bus occupancy rate, or a third bus occupancy rate for the CPU, which is obtained by subtracting the variable bus occupancy rate from the first bus occupancy rate for the CPU. The bus arbiter receives the first bus occupancy rates for the second and third master devices and controls a priority of use for the system bus in accordance with received bus occupancy rates for the CPU and the second and third master devices.

According to an embodiment of the present invention, a system comprises a CPU, which is a first master device, and second and third master devices, which share a system bus. The system comprises a storage device and a bus arbiter. The storage device stores first bus occupancy rates for the second and third master devices and a variable bus occupancy rate for increasing or decreasing a first bus occupancy rate for the CPU. In response to an interrupt signal provided to the CPU or a privilege mode signal generated by the CPU, the bus arbiter receives either a second bus occupancy rate for the CPU, which is a sum of the first bus occupancy rate for the CPU and the variable bus occupancy rate, or a third bus occupancy rate for the CPU, which is obtained by subtracting the variable bus occupancy rate from the first bus occupancy rate for the CPU. The bus arbiter also receives the first bus occupancy rates for the second and third master devices and controls a priority of use for the system bus in accordance with received bus occupancy rates for the CPU and the second and third master devices.

Preferably, the bus arbiter comprises an OR gate that receives the interrupt signal and the privilege mode signal.

Preferably, the bus arbiter comprises a multiplexer that receives either the second bus occupancy rate for the CPU or the third bus occupancy rate for the CPU in response to the interrupt signal or the privilege mode signal.

According to an embodiment of the present invention, a multi-layer bus system in which a CPU, which is a first master device, and second and third master devices use respective dedicated buses. This multi-layer bus system comprises first, second, and third system buses and a slave device. The first, second, and third system buses are exclusively used by the CPU and the second and third master devices, respectively. The slave device is coupled to each of the first through third system buses and comprises a storage device and a bus arbiter. The storage device stores first bus occupancy rates for the second and third master devices and a variable bus occupancy rate for increasing or decreasing a first bus occupancy rate for the CPU. In response to an interrupt signal provided to the CPU or a privilege mode signal generated by the CPU, the bus arbiter receiving either a second bus occupancy rate for the CPU, which is a sum of the first bus occupancy rate for the CPU and the variable bus occupancy rate, or a third bus occupancy rate for the CPU, which is obtained by subtracting the variable bus occupancy rate from the first bus occupancy rate for the CPU. The bus arbiter also receives the first bus occupancy rates for the second and third master devices and controls a priority of use for the system bus in accordance with received bus occupancy rates for the CPU and the second and third master devices.

According to an embodiment of the present invention, a PCI bus system comprises a PCI bus, a host device, a storage device, and a bus arbiter. The PCI bus is coupled to a plurality of slots. The host device is coupled to the PCI bus and controls the PCI bus system. The storage device stores bus occupancy rates for cards inserted into the slots and a variable bus occupancy rate for increasing or decreasing the bus occupancy rates. The bus arbiter controls a priority of use for the PCI bus in accordance with the bus occupancy rates for the cards in response to interrupt signals generated by the cards.

Preferably, the host device is a PCI bridge circuit, and the cards can be any of a graphic card, a network card, and a sound card.

According to an embodiment of the present invention, a card bus system comprises cards, a host device, a storage device, and a bus arbiter. The cards are coupled to a card bus. The host device is coupled to the card bus and controls the card bus system. The storage device stores bus occupancy rates for the cards and a variable bus occupancy rate for increasing or decreasing the bus occupancy rates. The bus arbiter controls a priority of use for the card bus in accordance with the bus occupancy rates for the cards in response to interrupt signals generated by the cards.

According to this bus arbitration method, while the CPU is performing an interrupt service, the CPU is assigned a bus use priority to reduce the time for waiting for the interrupt service and the time for processing the interrupt service. Hence, the interrupt service is earlier done. During the time other than the time for the interrupt service by the CPU, master devices other than the CPU are assigned bus use priorities in order to respond to an operation of an RTOS.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF PREFERRED EMBODIMENTS

Figure 3:
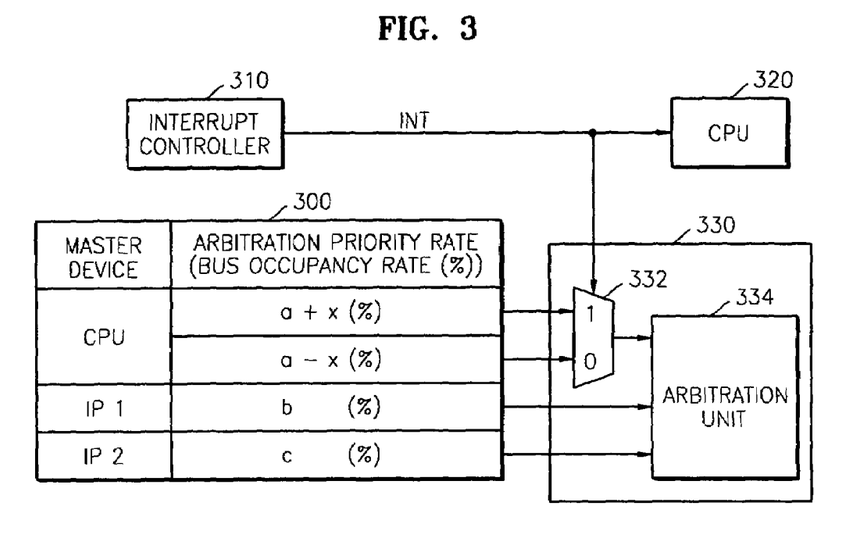
FIG. 3 is a block diagram for illustrating a method of arbitrating the use of a common bus, according to an embodiment of the present invention.

Referring to FIG. 3, a storage device 300 comprises different arbitrated priorities for master devices. Special registers are used to form the storage device 300. In the storage device 300, a CPU, which is a first master device, is assigned bus occupancy rates of a−x(%) and a+x(%), an IP1, which is a second master device, is assigned a bus occupancy rate of b(%), and an IP2, which is a third master device, is assigned a bus occupancy rate of c(%). The characters a, b, c, and x denote parameters that can be externally set.

An interrupt signal INT generated by an interrupt controller 310 is applied to a CPU 320 and a multiplexer (MUX) 332 of a bus arbiter 330. In response to the interrupt signal INT, the MUX 332 transmits either the bus occupancy rate of a−x(%) or the bus occupancy rate of a+x(%) to an arbitration unit 334. The arbitration unit 334 receives the output of the MUX 332, the bus occupancy rate of b(%) for the IP1, and the bus occupancy rate of c(%) for the IP2 and controls priority in using a common bus.

The arbitrated priorities a(%), b(%), and c(%) stored in the storage device 300 are bus occupancy rates allocated to the CPU, the IP1, and the IP2, respectively. x(%) denotes a variably allocated bus occupancy rate. For example, when a is 4%, b is 2%, and c is 2%, if x is set to be 1%, the CPU is assigned a bus occupancy rate of 5% or 3%. If the interrupt signal INT is activated to a logic high level, a 5% bus occupancy rate for the CPU, a 2% bus occupancy rate for the IP1, and a 2% bus occupancy rate for the IP2 are applied to the arbitration unit 334. Accordingly, the arbitration unit 334 gives a bus use priority corresponding to a 5/9 rate to a CPU, a bus use priority corresponding to a 2/9 rate to the IP1, and a bus use priority corresponding to a 2/9 rate to the IP2.

On the other hand, if the interrupt signal INT is inactivated, at a logic low level, a 3% bus occupancy rate for the CPU, a 2% bus occupancy rate for the IP1, and a 2% bus occupancy rate for the IP2 are applied to the arbitration unit 334. Accordingly, the arbitration unit 334 gives a bus use priority corresponding to a 3/7 rate to the CPU, a bus use priority corresponding to a 2/7 rate to the IP1, and a bus use priority corresponding to a 2/7 rate to the IP2.

In this bus arbitration method, when the interrupt signal INT is active, a bus use priority corresponding to a higher bus occupancy rate is assigned to the CPU 320 than the IP1 and IP2 so that the CPU 320 can occupy a system bus and perform a high-speed interrupt service routine. When the interrupt signal INT is inactive, the use occupancy rate for the CPU 320 is lowered, and the bus occupancy rates for the IP1 and IP2 are increased. Hence, the CPU 320 performs a service routine that is allowed to operate slowly, and the IP1 or IP2 occupies the system bus and performs a desired operation.

In a bus arbitration method according to an embodiment, a priority in the use of a system bus is dynamically allocated. When a system bus is busy, the bus occupancy rate for a device that wishes to use the system bus is increased by varying the variable occupancy rate x. Hence, a device with a low initial basic bus occupancy rate can be assigned a priority for the use of a system bus by shortening the time for waiting for the use of a bus or the interrupt processing time.

Figure 4:
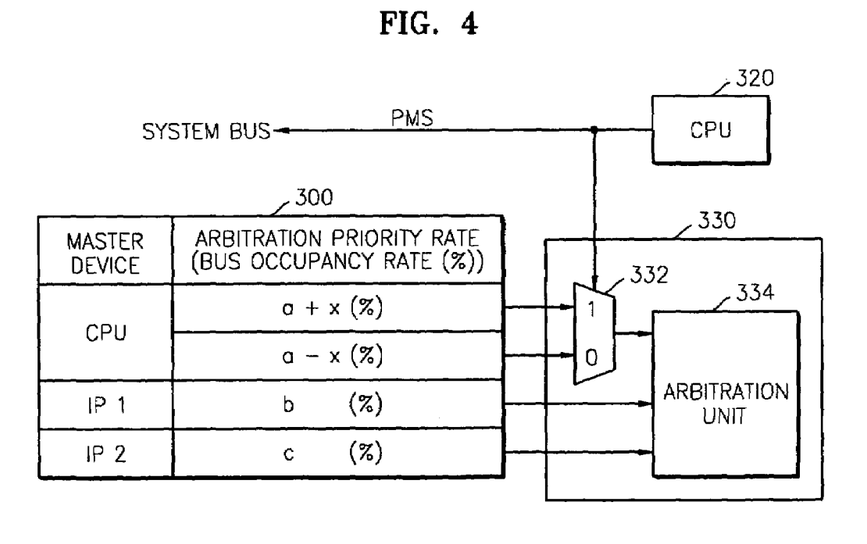
FIG. 4 is a block diagram for illustrating a method of arbitrating the use of a common bus, according to an embodiment of the present invention.

FIG. 4 is a block diagram for illustrating a method of arbitrating the use of a common bus, according to an embodiment of the present invention. Referring to FIG. 4, a system bus use priority is dynamically allocated using a privilege mode signal (PMS) generated by the CPU 320, instead of using an interrupt signal INT as shown in FIG. 3. Since the PMS can access all regions of a data processing system, it can access to the regions that cannot be accessed in a general user mode. Because the bus arbitration method described with respect to FIG. 4 is substantially similar to that of FIG. 3, duplicated portions will not be described in detail.

When the basic bus occupancy rates a, b, and c are 4%, 2%, and 2%, respectively, if the variable bus occupancy rate x is set to be 1%, and the PMS generated by the CPU 320 is activated to a logic high level, a 5% bus occupancy rate for a CPU, a 2% bus occupancy rate for an IP1, and a 2% bus occupancy rate for an IP2 are applied to the arbitration unit 334. Hence, a 5/9 bus use priority, which is higher than a basic 4/8 bus use priority, is assigned to the CPU, and a 2/9 bus use priority, which is lower than a basic 2/8 bus use priority, is assigned to the IP1 and IP2. If the PMS generated by the CPU 320 is inactivated, at a logic low level, a 3% bus occupancy rate for a CPU, a 2% bus occupancy rate for a first master device IP1, and a 2% bus occupancy rate for an IP2 are applied to the arbitration unit 334. Hence, a 3/7 bus use priority, which is lower than the basic 4/8 bus use priority, is assigned to the CPU, and a 2/7 bus use priority, which is higher than the basic 2/8 bus use priority, is assigned to the IP1 and IP2.

TABLE 1

| | INTERRUPT SIGNAL | (X = 1) | ACTIVE (+1) | INACTIVE (−1) |
|---|---|---|---|---|
| ARBITRATION PRIORITY RATE (BUS OCCUPANCY RATE (%)) | CPU | 4/8 | (4 + 1)/9 | (4 − 1)/7 |
| | IP 1 | 2/8 | 2/9 | 2/7 |
| | IP 2 | 2/8 | 2/9 | 2/7 |

Hence, a device that wants to use a system bus is assigned a high bus-use priority by using a PMS generated by the CPU 320 and a variable use occupancy rate x.

Figure 5:
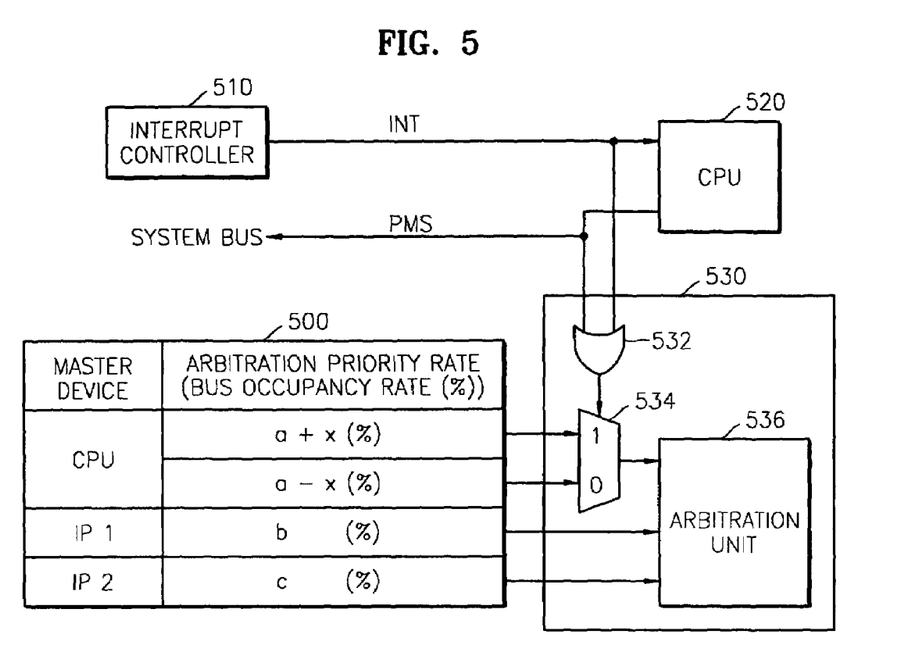
FIG. 5 is a block diagram for illustrating a method of arbitrating the use of a common bus, according to an embodiment of the present invention.

FIG. 5 is a block diagram for illustrating a method of arbitrating the use of a common bus, according to an embodiment of the present invention. In the use arbitration method of FIG. 5, a priority for use of a system bus is controlled using an interrupt signal INT and a privilege mode signal PMS.

A bus arbiter 530 comprises a logic circuit 532, which receives an interrupt signal INT, and a privilege mode signal PMS, a MUX 534, which responds to the output of the logic circuit 532, and an arbitration unit 536, which receives the output of the MUX 534 and bus occupancy rates for second and third master devices IP1 and IP2. The logic circuit 532 generates a logic high level in response to the interrupt signal INT and the privilege mode signal PMS. Preferably, the logic circuit 532 is an OR gate.

TABLE 2

|  | PMS SIGNAL | (X = 1) | ACTIVE (+1) | INACTIVE (−1) |
|---|---|---|---|---|
| ARBITRATION PRIORITY RATE (BUS OCCUPANCY RATE (%)) | CPU IP 1 IP 2 | 4/8 2/8 2/8 | (4 + 1)/9 2/9 2/9 | (4 − 1)/7 2/7 2/7 |

When the basic bus occupancy rates a, b, and c are assigned 4%, 2%, and 2%, respectively, if the variable bus occupancy rate x is set to be 1%, a 5% bus occupancy rate for a first master device, a CPU, a 2% bus occupancy rate for the IP1, and a 2% bus occupancy rate for the IP2 are applied to the arbitration unit 536 in response to the output of the logic circuit 532 in a logic high level. Hence, a 5/9 bus use priority, which is higher than a basic 4/8 bus use priority, is assigned to the CPU, and a 2/9 bus use priority, which is lower than a basic 2/8 bus use priority, is assigned to the IP1 and IP2. In response to the output of the logic circuit 532 in a logic low level, a 3% bus occupancy rate for the CPU, a 2% bus occupancy rate for the IP1, and a 2% bus occupancy rate for the IP2 are applied to the arbitration unit 536. Hence, a 3/7 bus use priority, which is lower than the basic 4/8 bus use priority, is assigned to the CPU, and a 2/7 bus use priority, which is higher than the basic 2/8 bus use priority, is allocated to the IP1 and IP2.

Figure 6:
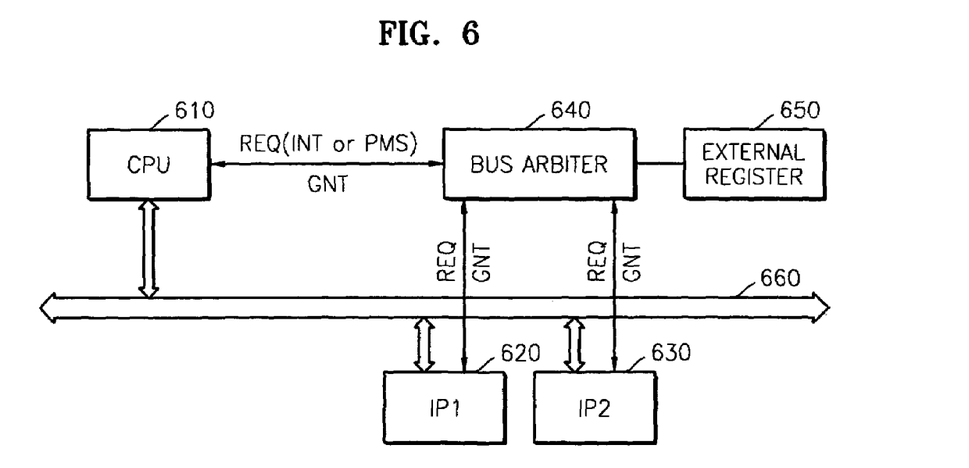
FIG. 6 is a block diagram of a single layer system bus structure adopting the bus arbiter described in the bus arbitration methods according to FIGS. 3–5.

FIG. 6 is a block diagram of a single layer system bus structure adopting the bus arbiter described in the bus arbitration methods according to FIGS. 3–5. Referring to FIG. 6, priorities for use of a single system bus 660, which is shared by a CPU 610, an IP1 620, and an IP2 630, are controlled by a bus arbiter 640. The CPU 610, the IP1 620, and the IP2 630 are first, second, and third master devices, respectively. The bus arbiter 640 arbitrates a priority in use of the single system bus 660 in accordance with variable bus occupancy rates on a bus priority list set in an external register 650.

Figure 7:
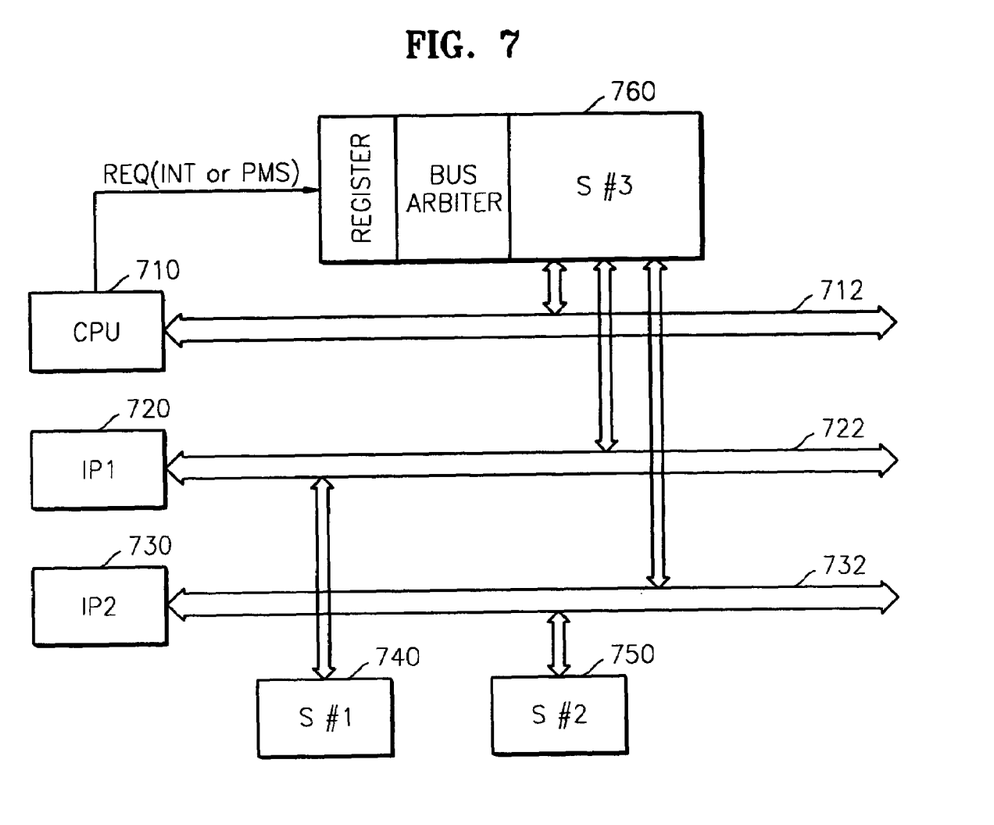
FIG. 7 is a block diagram of a multi-layer system bus structure adopting the bus arbiter described in the bus arbitration methods according to FIGS. 3–5.

FIG. 7 is a block diagram of a multi-layer system bus structure adopting the bus arbiter described in the bus arbitration method according to FIGS. 3–5. Referring to FIG. 7, a CPU 710, which is a first master device, exclusively uses a first system bus 712, a second master device (IP1) 720 exclusively uses a second system bus 722, and a third master device (IP2) 730 exclusively uses a third system bus 732. The IP1 720 writes data or reads data to or from a first slave device (S#1) 740 by using the second system bus 722. The IP2 730 writes data or reads data to or from a second slave device (S#2) 750 by using the third system bus 732. A third slave device (S#3) 760 is coupled to the CPU 710, the IP1 720, and the IP2 730, respectively, via the first, second, and third system buses 712, 722, and 732. Because the CPU 710, the IP1 720, and the IP2 730 use a system memory device (not shown), a multi-port memory controller can be used as the S#3 760. Table 3 presents the example described with respect to FIG. 5.

TABLE 3

|  | LOGIC SIGNAL | (X = 1) | HIGH (+1) | LOW (−1) |
|---|---|---|---|---|
| ARBITRATION PRIORITY RATE (BUS OCCUPANCY RATE (%)) | CPU IP 1 IP 2 | 4/8 2/8 2/8 | (4 + 1)/9 2/9 2/9 | (4 − 1)/7 2/7 2/7 |

The S#3 760, which is a memory controller, comprises a register as a storage device and a bus arbiter, which have been described in the bus arbitration methods according to FIGS. 3–5. The memory controller changes bus occupancy rates stored in the register to control a priority in use of each system bus.

Figure 8:
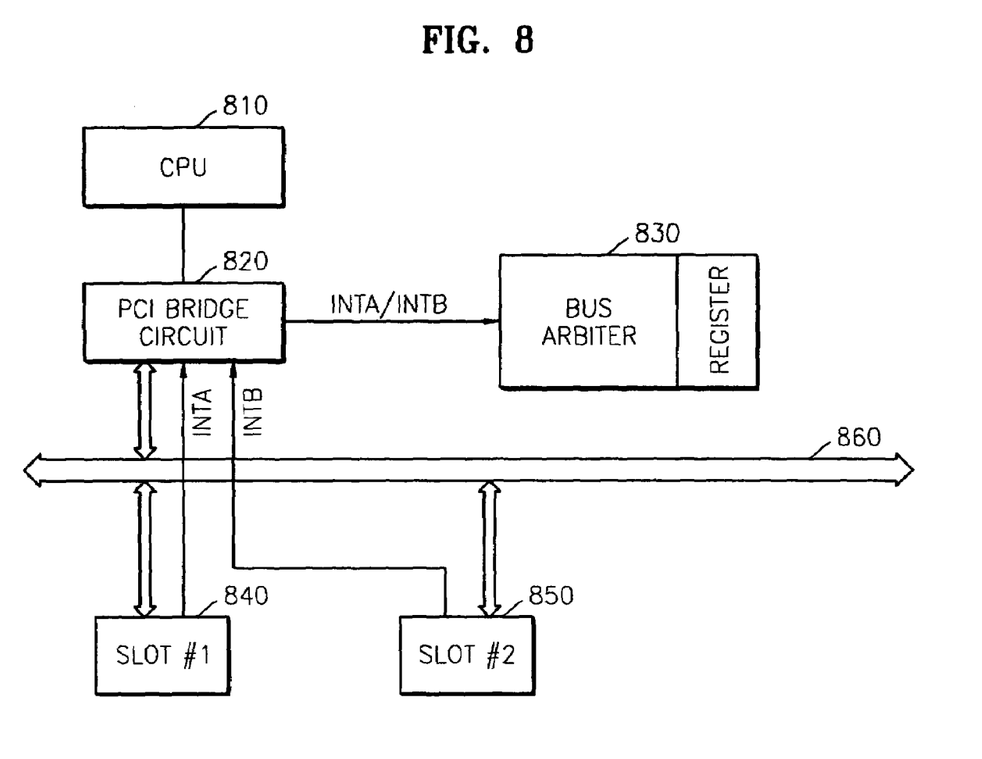
FIG. 8 is a block diagram of a peripheral component interconnection (PCI) system adopting the bus arbiter described in the bus arbitration methods according to FIGS. 3–5.

FIG. 8 is a block diagram of a peripheral component interconnection (PCI) system adopting the bus arbiter described in the bus arbitration methods according FIGS. 3–5. Referring to FIG. 8, a CPU 810 is coupled to a PCI bridge circuit 820, which is a host device. The PCI bridge circuit 820 is coupled to first and second slots 840 and 850 via a PCI system bus 860. A graphic card, a network card, a sound card, or the like is inserted into the first slot 840 or the second slot 850. Interrupt signals INTA and INTB generated from the cards inserted into the first and second slots 840 and 850 are transmitted to a bus arbiter 830 via the PCI bridge circuit 820. In response to the interrupt signals INTA and INTB, the bus arbiter 830 changes the bus occupancy rates set in the PCI bridge circuit 820 and in the cards inserted into the first and second slots 840 and 850, thereby controlling a bus use priority.

Although FIG. 8 describes the control of a priority in use of the PCI system bus 860, it is apparent to those skilled in the art that the priority control can be applied to a card bus system. The card bus system controls the bus use priorities of cards coupled to card sockets, in response to a card interrupt signal CINT.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of arbitrating a system bus that is shared by a CPU, which is a first master device, and second and third master devices, the method comprising:

storing a first bus occupancy rate for each of the CPU and the second and third master devices and a variable bus occupancy rate;

applying a second bus occupancy rate for the CPU, which is a sum of the first bus occupancy rate for the CPU and the variable bus occupancy rate, and the first bus occupancy rates for the second and third master devices to a bus arbiter, in response to an activation of an interrupt signal provided to the CPU;

applying a third bus occupancy rate for the CPU, which is obtained by subtracting the variable bus occupancy rate from the first bus occupancy rate for the CPU, and the first bus occupancy rates for the second and third master devices to the bus arbiter, in response to an inactivation of the interrupt signal; and controlling a priority for use of the system bus in accordance with the second and third bus occupancy rates for the CPU and the first bus occupancy rates of the second and third master devices that are applied to the bus arbiter.

2. A method of arbitrating a system bus that is shared by a CPU, which is a first master device, and second and third master devices, the method comprising:

storing a first bus occupancy rate for each of the CPU and the second and third master devices and a variable bus occupancy rate;

applying a second bus occupancy rate for the CPU, which is a sum of the first bus occupancy rate for the CPU and the variable bus occupancy rate, and the first bus occupancy rates for the second and third master devices to a bus arbiter in response to an activation of a privilege mode signal generated by the CPU;

applying a third bus occupancy rate for the CPU, which is obtained by subtracting the variable bus occupancy rate from the first bus occupancy rate for the CPU, and the first bus occupancy rates for the second and third master devices to the bus arbiter, in response to an inactivation of the privilege mode signal; and controlling a priority for use of the system bus in accordance with the second and third bus occupancy rates for the CPU and the first bus occupancy rates of the second and third master devices that are applied to the bus arbiter.

3. A method of arbitrating a system bus that is shared by a CPU, which is a first master device, and second and third master devices, the method comprising:

storing a first bus occupancy rate for each of the CPU and the second and third master devices and a variable bus occupancy rate;

applying a second bus occupancy rate for the CPU, which is a sum of the first bus occupancy rate for the CPU and the variable bus occupancy rate, and the first bus occupancy rates for the second and third master devices to a bus arbiter, in response to an activation of an interrupt signal provided to the CPU or a privilege mode signal generated by the CPU;

applying a third bus occupancy rate for the CPU, which is obtained by subtracting the variable bus occupancy rate from the first bus occupancy rate for the CPU, and the first bus occupancy rates for the second and third master devices to the bus arbiter, in response to an inactivation of the interrupt signal or the privilege mode signal; and controlling a priority for use of the system bus in accordance with the second and third bus occupancy rates for the CPU and the first bus occupancy rates of the second and third master devices that are applied to the bus arbiter.

4. A system including a CPU, which is a first master device, and second and third master devices, which share a system bus, the system comprising:

a device storing first bus occupancy rates for the second and third master devices and a variable bus occupancy rate for increasing or decreasing a first bus occupancy rate for the CPU; and a bus arbiter receiving either a second bus occupancy rate for the CPU, which is a sum of the first bus occupancy rate for the CPU and the variable bus occupancy rate, or a third bus occupancy rate for the CPU, which is obtained by subtracting the variable bus occupancy rate from the first bus occupancy rate for the CPU, in response to an interrupt signal provided to the CPU, receiving the first bus occupancy rates for the second and third master devices, and controlling a priority for use of the system bus in accordance with received bus occupancy rates for the CPU and the second and third master devices.

5. The system of claim 4, wherein the bus arbiter comprises a multiplexer which receives either the second bus occupancy rate for the CPU or the third bus occupancy rate for the CPU in response to the interrupt signal provided to the CPU.

6. A system including a CPU, which is a first master device, and second and third master devices, which share a system bus, the system comprising:

a device storing first bus occupancy rates for the second and third master devices and a variable bus occupancy rate for increasing or decreasing a first bus occupancy rate for the CPU; and a bus arbiter receiving either a second bus occupancy rate for the CPU, which is a sum of the first bus occupancy rate for the CPU and the variable bus occupancy rate, or a third bus occupancy rate for the CPU, which is obtained by subtracting the variable bus occupancy rate from the first bus occupancy rate for the CPU, in response to a privilege mode signal generated by the CPU, receiving the first bus occupancy rates for the second and third master devices, and controlling a priority for use of the system bus in accordance with received bus occupancy rates for the CPU and the second and third master devices.

7. The system of claim 6, wherein the bus arbiter comprises a mutiplexer which receives either the second bus occupancy rate for the CPU or the third bus occupancy rate for the CPU in response to the privilege mode signal generated by the CPU.

8. A system including a CPU, which is a first master device, and second and third master devices, which share a system bus, the system comprising:

a device storing first bus occupancy rates for the second and third master devices and a variable bus occupancy rate for increasing or decreasing a first bus occupancy rate for the CPU; and a bus arbiter receiving either a second bus occupancy rate for the CPU, which is a sum of the first bus occupancy rate for the CPU and the variable bus occupancy rate, or a third bus occupancy rate for the CPU, which is obtained by subtracting the variable bus occupancy rate from the first bus occupancy rate for the CPU, in response to an interrupt signal provided to the CPU or a privilege mode signal generated by the CPU, receiving the first bus occupancy rates for the second and third master devices, and controlling a priority for use of the system bus in accordance with received bus occupancy rates for the CPU and the second and third master devices.

9. The system of claim 8, wherein the bus arbiter comprises an OR gate for receiving the interrupt signal and the privilege mode signal.

10. The system of claim 8, wherein the bus arbiter comprises a multiplexer which receives either the second bus occupancy rate for the CPU or the third bus occupancy rate for the CPU in response to the interrupt signal or the privilege mode signal.

11. A multi-layer bus system in which a CPU, which is a first master device, and second and third master devices use their dedicated buses, the multi-layer bus system comprising:
- first, second, and third system buses exclusively used by the CPU and the second and third master devices, respectively; and
- a slave device coupled to each of the first through third system buses, wherein the slave device comprises:
  - a device storing first bus occupancy rates for the second and third master devices and a variable bus occupancy rate for increasing or decreasing a first bus occupancy rate for the CPU; and
  - a bus arbiter receiving either a second bus occupancy rate for the CPU, which is a sum of the first bus occupancy rate for the CPU and the variable bus occupancy rate, or a third bus occupancy rate for the CPU, which is obtained by subtracting the variable bus occupancy rate from the first bus occupancy rate for the CPU, in response to an interrupt signal provided to the CPU or a privilege mode signal generated by the CPU, receiving the first bus occupancy rates for the second and third master devices, and controlling a priority for use of the system bus in accordance with received bus occupancy rates for the CPU and the second and third master devices.

12. The multi-layer bus system of claim 11, wherein the bus arbiter comprises an OR gate for receiving the interrupt signal and the privilege mode signal.

13. The multi-layer bus system of claim 11, wherein the bus arbiter comprises a multiplexer which receives either a second bus occupancy rate for the CPU or the third bus occupancy rate for the CPU in response to the interrupt signal or the privilege mode signal.

14. A PCI bus system comprising:
- a PCI bus coupled to a plurality of slots;
- a host device coupled to the PCI bus, the host device controlling the PCI bus system;
- a device storing bus occupancy rates for a plurality of cards inserted into respective slots and a variable bus occupancy rate for increasing or decreasing the bus occupancy rates; and
- a bus arbiter controlling a priority for use of the PCI bus in accordance with the bus occupancy rates for the cards in response to interrupt signals generated by the cards.

15. The PCI bus system of claim 14, wherein the host device is a PCI bridge circuit.

16. The PCI bus system of claim 14, wherein each card is one of a graphic card, a network card, and a sound card.

17. A card bus system comprising:
- a plurality of cards coupled to a card bus;
- a host device coupled to the card bus, controlling the card bus system;
- a device storing bus occupancy rates for the cards and a variable bus occupancy rate for increasing or decreasing the bus occupancy rates; and
- a bus arbiter controlling a priority for use of the card bus in accordance with the bus occupancy rates for the cards in response to interrupt signals generated by the cards.

* * * * *